US 008154833B2

(12) United States Patent
Ritter et al.

(10) Patent No.: US 8,154,833 B2
(45) Date of Patent: Apr. 10, 2012

(54) LINE SIDE CROWBAR FOR ENERGY CONVERTER

(75) Inventors: Allen Michael Ritter, Salem, VA (US);
Rafael Ignacio Bedia, Salem, VA (US);
Cyrus David Harbourt, Salem, VA (US)

(73) Assignee: General Electric Company, Schenectady, NY (US)

(*) Notice: Subject to any disclaimer, the term of this patent is extended or adjusted under 35 U.S.C. 154(b) by 187 days.

(21) Appl. No.: 12/550,585

(22) Filed: Aug. 31, 2009

(65) Prior Publication Data

US 2010/0134935 A1     Jun. 3, 2010

(51) Int. Cl.
*H02H 9/00* (2006.01)
*F03D 9/00* (2006.01)
*H02P 9/04* (2006.01)

(52) U.S. Cl. .......................... 361/54; 290/44
(58) Field of Classification Search ............ 361/54
See application file for complete search history.

(56) References Cited

U.S. PATENT DOCUMENTS

| 5,426,579 | A | 6/1995 | Paul et al. | |
|---|---|---|---|---|
| 7,332,827 | B2 * | 2/2008 | Nielsen | 290/55 |
| 7,547,353 | B2 | 6/2009 | Reyes et al. | |
| 7,586,216 | B2 * | 9/2009 | Li et al. | 307/151 |
| 7,919,879 | B2 * | 4/2011 | Flannery et al. | 290/44 |
| 2004/0145188 | A1 * | 7/2004 | Janssen et al. | 290/44 |
| 2005/0116476 | A1 * | 6/2005 | Feddersen | 290/44 |
| 2007/0024059 | A1 | 2/2007 | D'Atre et al. | |
| 2007/0052244 | A1 * | 3/2007 | Hudson | 290/44 |
| 2009/0008937 | A1 * | 1/2009 | Erdman et al. | 290/44 |
| 2009/0079191 | A1 * | 3/2009 | Mari et al. | 290/43 |
| 2009/0206606 | A1 * | 8/2009 | Jorgensen et al. | 290/44 |
| 2010/0141041 | A1 | 6/2010 | Bose et al. | |

FOREIGN PATENT DOCUMENTS

| EP | 0250719 | 1/1988 |
|---|---|---|
| EP | 1443634 | 8/2004 |
| WO | 2004040748 A1 | 5/2004 |
| WO | 2006069569 | 7/2006 |

OTHER PUBLICATIONS

Leja, U.S. Appl. No. 12/699,606, Office Action Communication, Jun. 23, 2011, 11 pages.
EP Application No. 11152181.1-1242, Search Report & Written Opinion, Apr. 27, 2011, 8 pages.
Leja, Notice of Allowance & Fees Due for U.S. Appl. No. 1/699,606 dated Dec. 21, 2011, 5 pages.
Leja, U.S. Appl. No. 12/699,606, Office Action Communication, Sep. 13, 2011, 16 pages.

* cited by examiner

*Primary Examiner* — Dharti Patel
(74) *Attorney, Agent, or Firm* — Hoffman Warnick LLC

(57) ABSTRACT

A line side crowbar circuit for an energy converter is disclosed. In one aspect there is a power unit that includes an energy converter; a transformer configured to transfer electrical energy generated from the energy converter to an electrical grid; and a crowbar coupled to the energy converter and the transformer that is configured to prevent an overvoltage event from damaging electrical components associated with the energy converter and the transformer.

16 Claims, 4 Drawing Sheets

LINE SIDE CROWBAR FOR ENERGY CONVERTER

BACKGROUND OF THE INVENTION

The present invention relates generally to renewable energy and more particularly to controlling power flow in an energy converter used with a renewable energy-based power unit.

Wind turbines are one type of renewable energy-based power unit that competes with traditional forms of electric power generation. As a result, wind turbines depend on cost effective, reliable as well as safe means to capture wind energy and convert it to electrical energy that is suitable for delivery miles away. In operation, the wind turbines have a multiple of rotating blades connected to a rotor shaft that are turned by the wind. The rotation of the blades by the wind spins the rotor shaft to generate a rotational torque or force that drives one or more generators to convert mechanical energy to electrical energy. The rotor shaft and generator are mounted within a housing or nacelle that is positioned on top of a truss or tubular tower. The electrical energy generated in the nacelle is distributed down through the tower to a utility grid via a transformer.

Generally, a medium voltage is used to collect electric power from wind turbines in a typical wind power generation application. Normally, individual wind turbines disconnect from groups of turbines and a transformer in response to the blowing of a fuse in the transformer. Often times, there is a possibility that a failure in a wind turbine can arise that causes a progression of subsequent failures that are not sufficient enough to blow a fuse. Consequently, these failures can lead to the overheating and burning of electrical equipment in the wind turbine. For example, there may be a failure of electrical equipment in the wind turbine that leads to the drawing of a substantial amount of current, but not enough to reduce the voltage associated with the failure. This results in the generation of very high power which can rapidly raise the temperature of the equipment to unacceptable levels.

BRIEF DESCRIPTION OF THE INVENTION

Therefore, it is desirable to discern failures in a wind turbine that can lead to an overvoltage event that generates high currents that are not sufficient to blow a fuse indicating a fault, but that are still dangerous enough to progress to the point where equipment in the wind turbine will exceed an acceptable temperature level.

In one aspect of the present invention, a power unit is provided. The power unit comprises an energy converter, a transformer configured to transfer electrical energy generated from the energy converter to an electrical grid; and a crowbar coupled to the energy converter and the transformer that is configured to prevent an overvoltage event from damaging electrical components associated with the energy converter and the transformer.

In another aspect of the present invention, a wind power unit is provided. The wind power unit comprises at least one wind turbine that includes a nacelle housing a generator mounted on a tower and rotating blades attached to a rotating hub coupled to the nacelle. A transformer is configured to transfer electrical energy generated from the at least one wind turbine to an electrical grid. A crowbar circuit, coupled at the base of the tower of the at least one wind turbine and at the transformer at a location that is proximate to the at least one wind turbine, is configured to prevent an overvoltage event from damaging electrical components associated with the at least one wind turbine and the transformer. A monitoring unit is configured to activate operation of the crowbar circuit in response to determining that there is an overvoltage event occurring at the at least one wind turbine that has the potential to damage the electrical components associated with the wind turbine and transformer.

In a third aspect of the present invention, there exists a method for preventing an overvoltage event from damaging a power generation unit having at least one energy converter and a transformer that transfers electrical energy generated from the at least one energy converter to an electrical grid. The method comprises: coupling a crowbar to the at least one energy converter and the transformer; monitoring the operation of the at least one energy converter and the transformer for a destructive current associated with the overvoltage event that is below a fuse interrupting current; and activating the crowbar in response to detecting that there is a destructive current associated with the overvoltage event.

DETAILED DESCRIPTION OF THE INVENTION

Various embodiments of the present invention include the use of a shorting device such as a crowbar circuit with a wind turbine, wherein the crowbar is located between the wind turbine and a transformer that delivers electrical energy from the wind turbine to an electrical grid. Technical effects of the various embodiments include preventing overvoltage events from damaging electrical components of the wind turbine and transformer by detecting such events and activating the crowbar circuit upon detection. Other technical effects include diverting destructive current away from the electrical components of the wind turbine and transformer and raising the current to a level that causes the blowing of at least one fuse associated with the transformer.

Although the various embodiments of the present invention described herein are directed to using a shorting device such as a crowbar circuit with a wind turbine, embodiments of the present invention have a wider application of use than with a wind power unit. In particular, embodiments of the present invention are suitable for any power generation unit such as for example a renewable energy-based power unit. An illustrative, but non-exhaustive list of renewable energy-based power units that may be suited for use with the present invention may include solar, battery energy storage systems, water, geothermal, etc. Those skilled in the art would be able to apply the principals of the various embodiments of the present invention to the energy converter used with each of these renewable energy-based power units and the transformer used to distribute the energy to the electrical grid.

Figure 1:
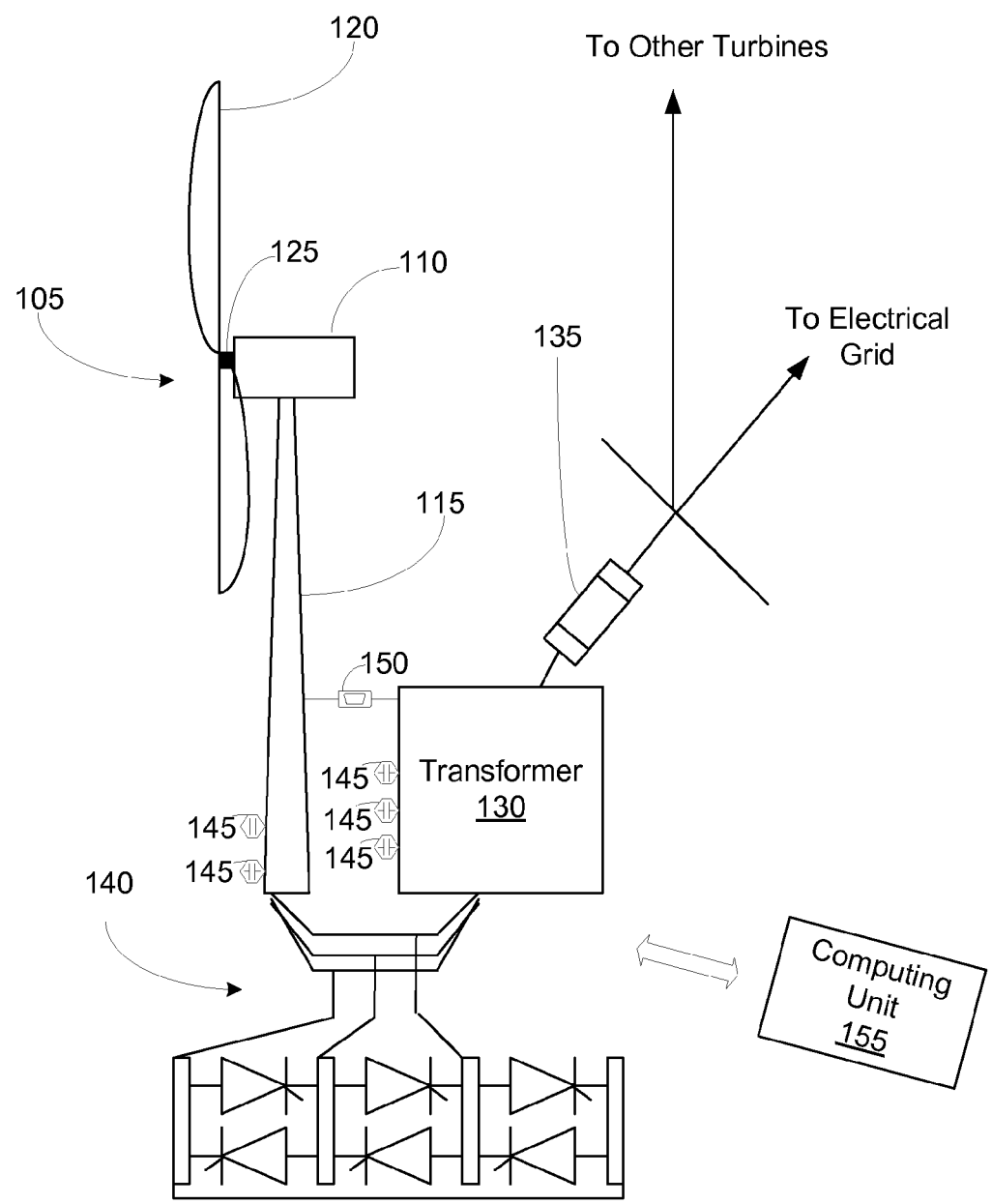
FIG. 1 is a schematic illustration of a wind power unit according to one embodiment of the present invention.

Referring to the drawings, FIG. 1 is a schematic illustration of a wind power unit 100 according to one embodiment of the present invention. As shown in FIG. 1, wind power unit 100 includes an energy converter such as a wind turbine 105. For ease of illustration, only one wind turbine is shown in FIG. 1, however, wind power unit 100 may include more than one wind turbine 105. Wind turbine 105 includes a nacelle 110 housing a generator (not shown in FIG. 1). Nacelle 110 is mounted atop a tall tower 115. Rotating blades 120 attach to a rotating hub 125 along a rotor shaft (not shown in FIG. 1). Although wind turbine 105 illustrated in FIG. 1 includes two rotating blades 120, there are no specific limits on the number of rotating blades required by the various embodiments of the present invention. Thus, more or less rotating blades 120 may be provided. Furthermore, those skilled in the art will recognize that wind turbine 105 can have more componentry than what is illustrated in FIG. 1. For example, nacelle 110 may have a gear box that couples a low-speed shaft of the rotor to a high-speed shaft and a controller that controls operation of the generator.

Wind power unit 100 further includes a transformer 130 that receives electrical energy generated from wind turbine 105 and transfers it to an electrical grid. Attached to transformer 130 is a fuse 135 that acts to serve as an overcurrent protection device by interrupting any failures causing an overcurrent. For ease of illustrating embodiments of the present invention, only a single fuse 135 is shown, however, those skilled in the art will recognize that there will be a larger number of fuses associated with transformer 130. In one embodiment, transformer 130 is a step-up transformer although it is conceivable that other transformers such as a step-down transformer may be used in conjunction with embodiments of the present invention. Furthermore, although transformer 130 is shown in FIG. 1 as a separate unit apart from wind turbine 105, those skilled in the art will recognize that transformer 130 may be part of the wind turbine and located at tower 115.

As shown in FIG. 1, a crowbar 140 is coupled to wind turbine 105 and transformer 130. Crowbar 140 is configured to prevent an overvoltage event from damaging wind turbine 105 and transformer 130. In one embodiment, crowbar 140 is configured to divert current generated from the overvoltage event along a path that leads away from electrical components located at the base of tower 115 of wind turbine 105. In addition, crowbar 140 reduces the voltage associated with the overvoltage event by raising the diverted current to a level that causes blowing of fuse 135. In one embodiment, crowbar 140 is coupled at the base of tower 115 of wind turbine 105 and at transformer 130 at a location that is wind turbine side (i.e., the side proximate to wind turbine 105 as opposed to the electrical grid).

As is well-known in the art, a crowbar circuit is an electrical circuit used to prevent an overvoltage condition of a power supply unit from damaging equipment attached to the power supply. The crowbar circuit operates by putting a short circuit or low resistance path across a voltage source. Essentially, the crowbar reduces the voltage and causes the current to go high enough to blow a fuse(s), interrupting the progression of the failure that is the cause for the overvoltage event. Crowbar circuits are frequently implemented by using a thyristor (also called a silicon controlled rectifier—SCR) or thyratron.

In one embodiment, the crowbar comprises a three phase rectifier with an SCR and SCR gating circuit. Those skilled in the art will recognize that this crowbar configuration is one possibility and embodiments of the present invention are not limited to any particular type of crowbar circuit.

Those skilled in the art will recognize that other shorting devices may be used in place of the crowbar circuit. For example, a non-exhaustive list of possible devices that may be used includes contacts and interrupters (e.g., a circuit breaker).

Referring back to FIG. 1, wind power unit 100 further comprises a monitoring unit configured to activate operation of crowbar 140 in response to determining that there is an overvoltage event occurring at wind turbine 105 that has the potential to damage electrical components associated with wind turbine 105 and transformer 130. The monitoring unit comprises a plurality of sensors 145 located about tower 115 of the wind turbine 105 and transformer 130 at the wind turbine side (i.e., at a location that is proximate to the wind turbine). In one embodiment, the plurality of sensors 145 comprises at least one voltage sensor located about the base of tower 115 of wind turbine 105 and at least one current sensor (e.g., three-phase current sensor) located about transformer 130 at the wind turbine 105 side (i.e., a location that is proximate to the wind turbine).

Those skilled in the art will recognize that wind power unit 100 can have other sensors in addition to the voltage sensors and current sensors to monitor other operation parameters associated with the wind power generation. For example, there may be sensors to measure the speed of rotating blades 120 and the shafts of the rotor.

FIG. 1 shows that the wind power unit 100 may include a three-phase conductor 150 providing a connection from tower 115 of wind turbine 105 to the turbine side of transformer 130. Three-phase conductor 150 carries three alternating currents (of the same frequency) which reach their instantaneous peak values at different times. Taking one conductor as the reference, the other two currents are delayed in time by one-third and two-thirds of one cycle of the electrical current. This delay between "phases" has the effect of giving constant power transfer over each cycle of the current. Three-phase conductor 150 may or may not have a neutral wire which generally allows the three-phase system to use a higher voltage while still supporting a lower-voltage.

The monitoring unit further includes a computing unit 155 that is configured to receive measurements from each of the respective plurality of sensors and use the measurements to detect whether there is an overvoltage event occurring at wind turbine 105 that has the potential to damage electrical components associated with the wind turbine and transformer 130. Computing unit 155 may be located remotely from wind power unit 100 or on-site near wind turbine 105 or transformer 130. By receiving voltage and current measurements, computing unit 155 has the capacity to determine the amount of power delivered from wind turbine 105 to transformer 130. In addition, the voltage and current measurement can be used by computing unit 155 to determine the amount of power extracted from rotating hub 125. Further, current measurements from the current sensors can be used to determine if there is a current that is being delivered in the phase current as opposed to a ground current which can form a destructive heating component.

Essentially, computing unit 155 uses these voltage and current measurements along with the power calculations to determine if there is a destructive heating component associated with overvoltage event which is indicative that such a heating component has the potential to cause damage to electrical components if the overvoltage event progresses further. If computing unit 155 determines that there is a destructive heating component associated with the overvoltage event then it activates crowbar 140.

Figure 2:
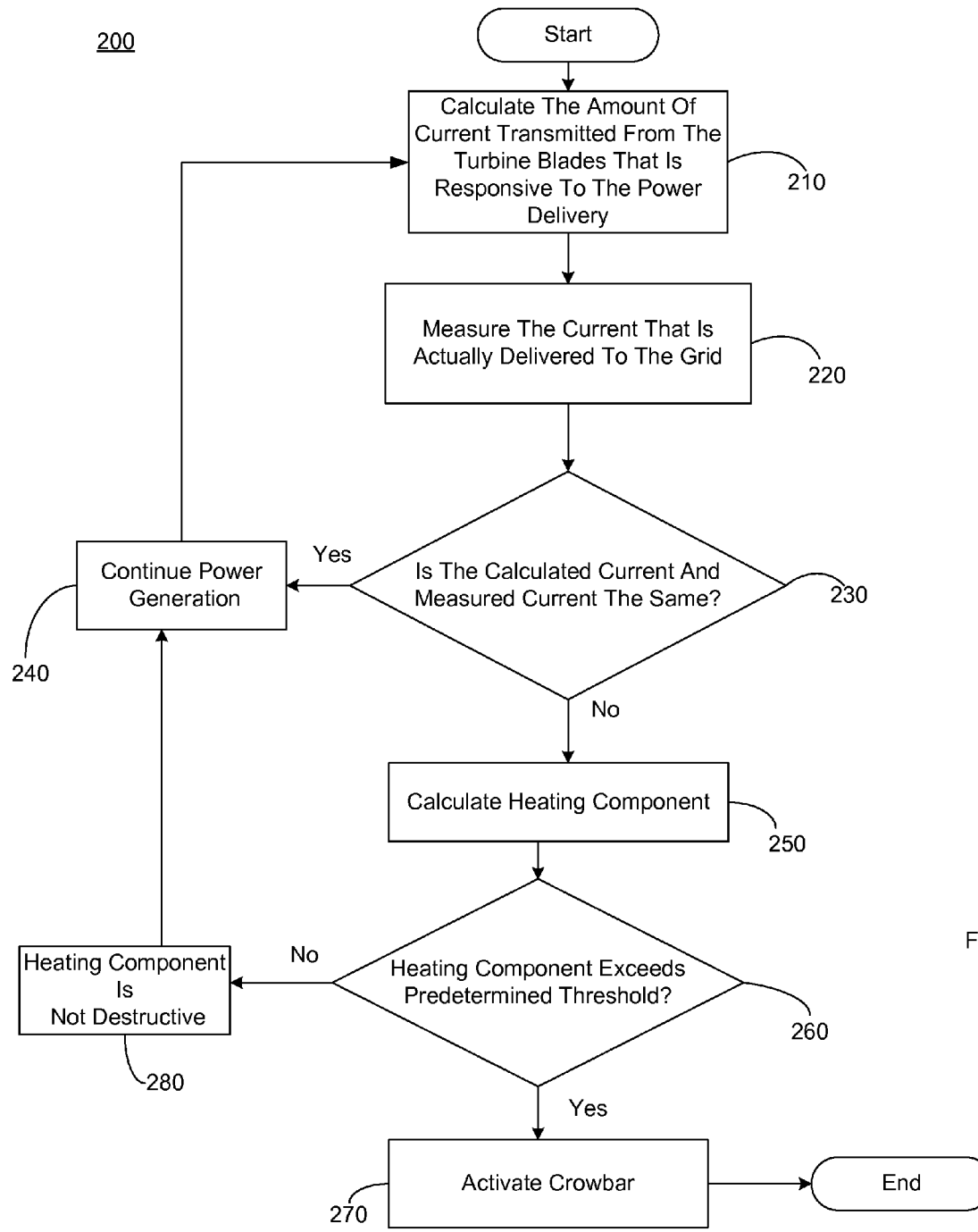
FIG. 2 is a flow chart describing the process operations associated with activating the crowbar circuit depicted in FIG. 1 according to one embodiment of the present invention.

FIG. 2 illustrates one approach that computing unit 155 uses to determine if there is a destructive heating component associated with the overvoltage event. In particular, FIG. 2 is a flow chart 200 describing the process operations associated with activating the crowbar 140 embodiment of the present invention. The determination in the embodiment described in FIG. 2 relies on determining the destructive heating component from the amount of current that is responsive to the power delivered from the rotating hub 125 of wind turbine 105 and the amount of current actually measured at the point where power is delivered from transformer 130 to the electrical grid.

The determination of a destructive heating component begins in FIG. 2 at 210 where the computing unit calculates the amount of current transmitted from the rotating blades that is responsive to the power delivered from the rotating hub of the wind turbine. Calculating the amount of current transmitted from the rotating blades that is responsive to the power delivered from the rotating hub may be determined by multiplying current times the in-phase voltage summed for all three power conductors (i.e., for three phase connections).

Next, at 220 the current that is actually delivered from the transformer to the electrical grid is measured. This can be obtained by reading the values of the current sensors at transformer.

At 230, the computing unit determines whether the calculated current transmitted from the blades that is responsive to the power delivery from the rotating hub is essentially the same as the measured current of what is actually delivered to the electrical grid. If the currents are essentially the same, then power generation continues at 240 and the process of calculating the current transmitted from the blades, measuring the current delivered to the electrical grid and comparing the currents continues.

If it is determined at 230 that the calculated current transmitted from the blades that is responsive to the power delivery from the rotating hub is not essentially the same as the measured current of what is actually delivered to the electrical grid, then this is an indication that a heating component exists and thus at 250 a heating component is calculated. In one embodiment, the heating component is calculated by summing the amount of current that is responsive to the power delivered with the amount of the actual current delivered from the transformer to the electrical grid to generate an aggregate current value Next, the process continues at 260 where the calculated heating component (i.e., the aggregate current) is compared to a predetermined current threshold that is indicative of currents that are representative of a destructive heating component. If the calculated heating component exceeds the predetermined current threshold then the crowbar circuit is activated at 270 in order to reduce the overvoltage event by reducing the voltage and cause the diverted current to blow a fuse if outer, less-intrusive means to reduce lost power are not effective. If the calculated heating component does not exceed the predetermined current threshold then the heating component is considered to be normal operating heating and not one that is destructive at 280, and the power generation continues at 240 as well does other process steps 210-260. In this embodiment, any time during the power generation that the computing unit determines that the heating component exceeds the predetermined current threshold, then it will activate the crowbar.

Figure 3:
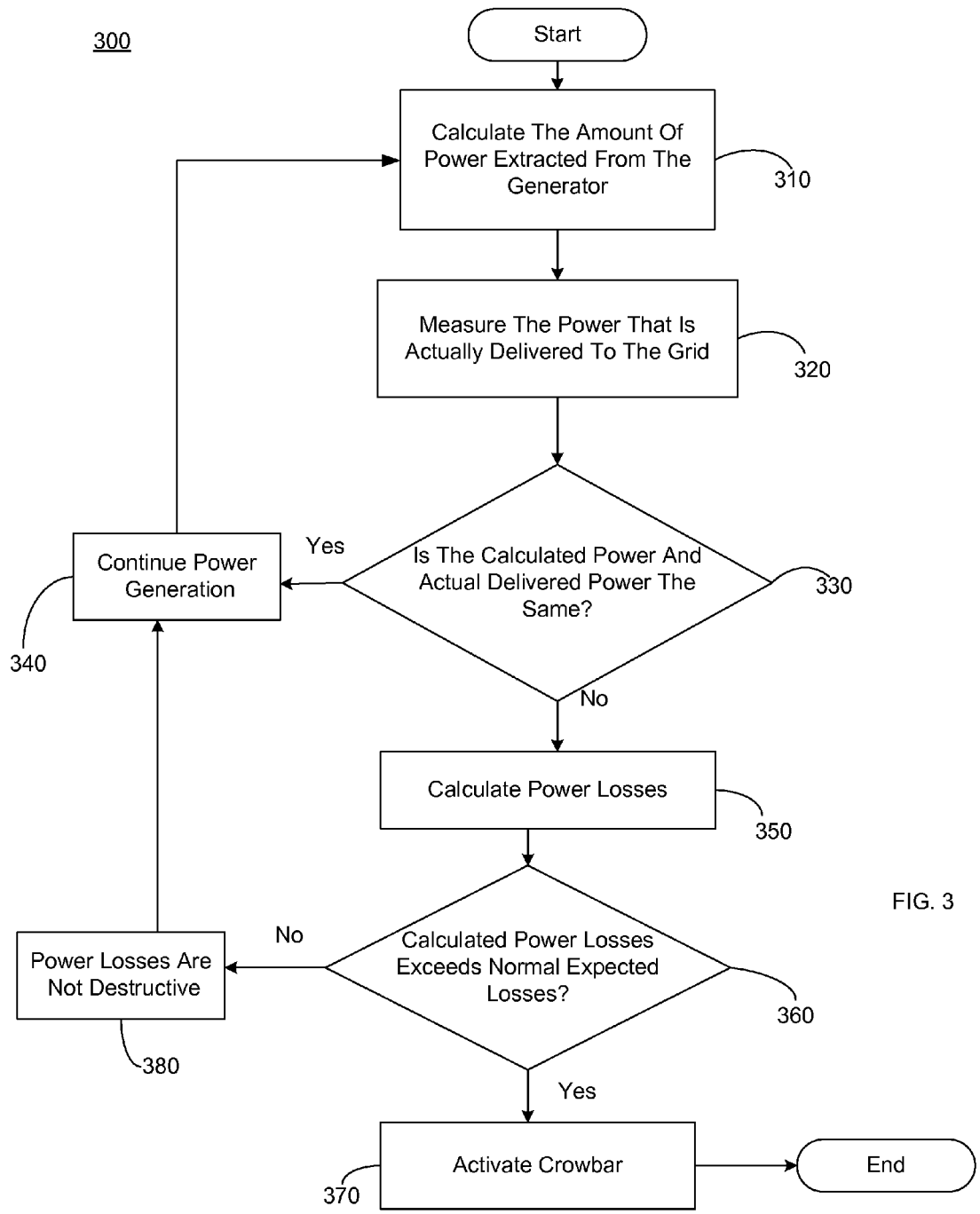
FIG. 3 is a flow chart describing the process operations associated with activating the crowbar circuit depicted in FIG. 1 according to another embodiment of the present invention.

FIG. 3 illustrates a second approach that computing unit 155 can use to determine if there is a destructive heating component associated with the overvoltage event. In particular, FIG. 2 is a flow chart 300 describing the process operations associated with activating the crowbar 140 according to a second embodiment of the present invention. The determination in the embodiment described in FIG. 3 relies on the power delivered from the rotating hub 125 of wind turbine 105 and the actual measured power that is delivered from transformer 130 to the electrical grid to detect whether a destructive heating component exists.

The determination of a destructive heating component according to this embodiment begins in FIG. 3 at 310 where the computing unit calculates the power delivered from the rotating hub of the wind turbine. Calculating the amount of the power delivered from the rotating hub is determined by the product of speed and torque of the rotating hub.

Next, at 320 the amount of power that is actually delivered from the transformer to the electrical grid is measured. This can be obtained by taking the product of voltage and current and power factor and a factor to account for the number of phases such as for example, the square root of three for three phases.

At 330, the computing unit determines whether the calculated power delivered from the rotating hub is essentially the same as the measured power actually delivered to the electrical grid. If the power amounts are essentially the same, then power generation continues at 340 and the process of calculating the power generated from the rotating hub, measuring the power delivered to the electrical grid and comparing these power amount continues.

If it is determined at 330 that the calculated power delivered from the rotating hub is not essentially the same as the measured power of what is actually delivered to the electrical grid, then the power losses are calculated at 350. In one embodiment, the power losses are calculated by power received minus the power delivered.

Next, the process continues at 360 where the power losses are compared to a predetermined power threshold that is indicative of a destructive heating component. If the calculated power losses exceed the predetermined power threshold then the crowbar circuit is activated at 370. If the calculated power losses do not exceed the predetermined power threshold then the heating component is considered to be normal operating heating and not destructive at 380, and the power generation continues at 340 as well does other process steps 310-360. In this embodiment, any time during the power generation that the computing unit determines that the power losses exceed the predetermined power threshold, then it will activate the crowbar.

The foregoing flow charts show some of the processing functions associated with determining if there is a destructive heating component associated with an overvoltage event occurring in a wind power unit. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 4:
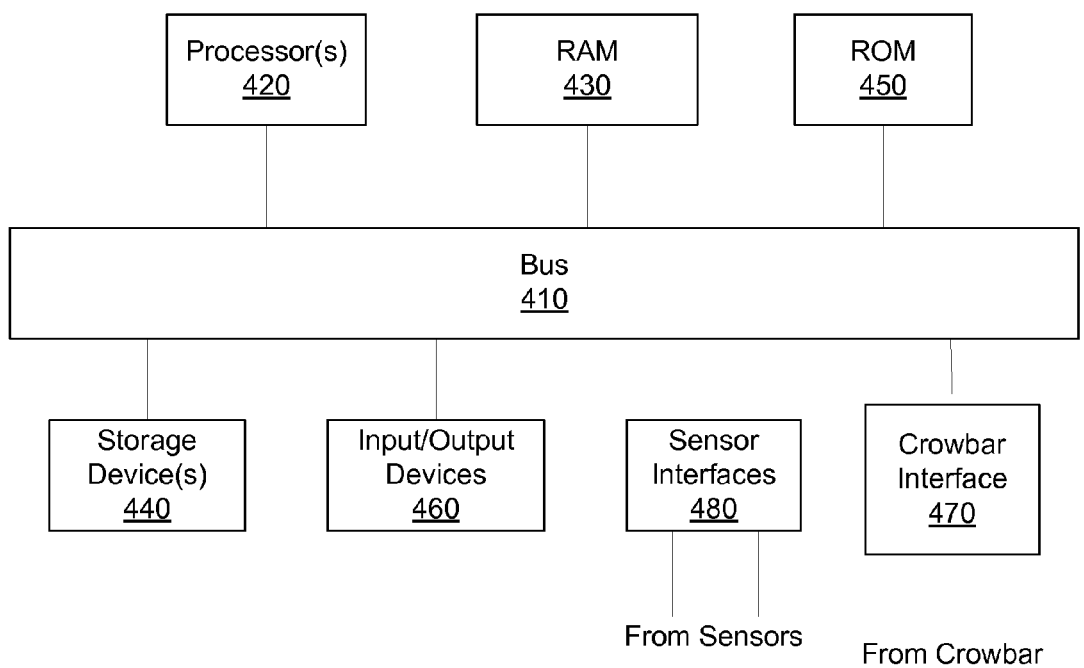
FIG. 4 is a block diagram of a configuration of a computing unit depicted in FIG. 1 according to one embodiment of the present invention.

FIG. 4 is a block diagram of a configuration of computing unit 155 depicted in FIG. 1 according to one embodiment of the present invention. As shown in FIG. 4, computing unit 155 includes a bus 410 or other communication device to communicate information. Processor(s) 420 are coupled to the bus 410 to process information, including information from sensors configured to measure power levels, current levels, voltage levels and any other sensors that are used to monitor operating conditions of wind power unit 100. Computing unit 155 further includes random access memory (RAM) 430 and/or other storage device(s) 440. The RAM 430 and storage device(s) 440 are coupled to the bus 410 to store and transfer information and instructions to be executed by the processor(s) 420. The RAM 430 (and also the storage device(s) 440, if required) also can be used to store temporary variables or other intermediate information during execution of instructions by the processor(s) 420. Computing unit 155 can also include read only memory (ROM) and or another static storage device 450, which is coupled to the bus 410 to store and provide static (i.e., non-changing) information and instructions to the processor(s) 420. Input/output device(s) 460 may be provided and can include any device known in the art to provide input data to the computing unit 155. Instructions are provided to memory from a storage device, such as magnetic disk, a ROM integrated circuit, CD-ROM, DVD, via a remote connection that is either wired or wireless and that provides access to one or more electronically-accessible media, etc. In various embodiments, hard-wired circuitry can be used in place of or in combination with software instructions. Thus, execution of sequences of instructions is not limited to any specific combination of hardware circuitry and software instructions. A crowbar circuit interface 470 is an interface that allows computing unit 155 to communicate with the crowbar circuit 140. Sensor interface 480 is an interface that allows computing unit 155 to communicate with one or more sensors. The sensor interface 480 can be or can include, for example, one or more analog-to-digital converters that convert analog signals into digital signals that can be used by processor(s) 420. These sensors can sense, for example, excessive power conditions or transients within the wind turbine 100.

In a preferred embodiment, the processing functions performed by the computing unit 155 are implemented in software, which includes but is not limited to firmware, resident software, microcode, etc. The processing functions performed by computing unit 155 can take the form of a computer program product accessible from a computer-usable, computer-readable medium or storage medium providing program code for use by or in connection with a computer or any instruction execution system. For the purposes of this description, a computer-usable, computer readable medium or storage medium can be any apparatus that can contain or, store the program for use by or in connection with the computer, instruction execution system, apparatus, or device. The computer-usable, computer readable medium or storage medium can be an electronic, magnetic, optical, electromagnetic, infrared, or semiconductor system (or apparatus or device). Examples of a computer-usable, computer readable medium or storage medium include a semiconductor or solid state memory, magnetic tape, a removable computer diskette, RAM, ROM, a rigid magnetic disk and an optical disk. Current examples of optical disks include a compact disk-read only memory (CD-ROM), a compact disk-read/write (CD-R/W) and a digital video disc (DVD).

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A power unit, comprising:
    an energy converter;
    an electrical grid;
    a transformer configured to transfer electrical energy generated from the energy converter to the electrical grid;
    at least one fuse located between the electrical grid and the transformer; and
    a crowbar located between the energy converter and the transformer at a line side of the energy converter that connects to the electrical grid, the crowbar configured to prevent an overvoltage event from damaging electrical components associated with the energy converter and the transformer, wherein the overvoltage event is insufficient to blow the at least one fuse, the crowbar preventing the overvoltage event from damaging the electrical components by diverting current generated from the overvoltage event away from the electrical components and raising the diverted current to a level that causes blowing of the at least one fuse between the electrical grid and the transformer, thereby isolating the energy converter and the transformer from the electrical grid.

2. The power unit according to claim 1, wherein the crowbar is coupled at the energy converter and at the transformer at a location that is proximate to the energy converter.

3. The power unit according to claim 1, further comprising a monitoring unit configured to activate operation of the crowbar in response to determining that there is an overvoltage event occurring at the energy converter that has the potential to damage the electrical components associated with the energy converter and transformer.

4. The power unit according to claim 3, wherein the monitoring unit comprises a plurality of sensors located about the energy converter and the transformer and a computing unit configured to receive measurements from each of the respective plurality of sensors and use the measurements to detect whether there is an overvoltage event occurring at the energy converter that has the potential to damage the electrical components associated with the energy converter and the transformer.

5. The power unit according to claim 4, wherein the plurality of sensors comprises at least one voltage sensor located about the energy converter and at least one current sensor located about the transformer at a location that is proximate to the energy converter.

6. The power unit according to claim 4, wherein the computing unit activates operation of the crowbar in response to determining that there is a destructive heating component associated with the overvoltage event.

7. The power unit according to claim 6, wherein the computing unit compares the amount of power transmitted from the energy converter to the amount of power that is actually being delivered from the transformer to the electric grid and compares any difference therebetween to a predetermined power threshold to determine if there is a destructive heating component.

8. The power unit according to claim 7, wherein the comparison of the amount of power transmitted from the energy converter to the amount of power that is actually being delivered from the transformer to the electric grid comprises computing power losses associated with the electrical equipment in the energy converter and comparing to normal power losses expected at the electric grid and comparing the difference therebetween to the predetermined power threshold.

9. The power unit according to claim 6, wherein the computing unit determines the amount of current that is responsive to the power delivered by the energy converter and the amount of the actual current delivered from the transformer to the electrical grid and determines if there is a destructive heating component therefrom.

10. The power unit according to claim 9, wherein the amount of current that is responsive to the power delivered is summed with the amount of the actual current delivered from the transformer to the electrical grid to generate an aggregate current value.

11. The power unit according to claim 10, wherein the aggregate current value is compared with a predetermined current threshold, the aggregate current being within a range of the predetermined current threshold is indicative of a destructive heating component.

12. A wind power unit, comprising:
at least one wind turbine that includes a nacelle housing a generator mounted on a tower and rotating blades attached to a rotating hub coupled to the nacelle;
an electrical grid;
a transformer configured to transfer electrical energy generated from the at least one wind turbine to the electrical grid;
an overcurrent protection device located between the electrical grid and the transformer;
a crowbar circuit located between the at least one wind turbine and the transformer at a line side of the at least one wind turbine that connects to the electrical grid, the crowbar circuit configured to prevent an overvoltage event from damaging electrical components associated with the at least one wind turbine and the transformer, wherein the overvoltage event is insufficient to activate the overcurrent protection device, the crowbar circuit preventing the overvoltage event from damaging the electrical components by diverting current generated away from the electrical components and raising the diverted current to a level that causes activation of the overcurrent protection device located between the electrical grid and the transformer, thereby isolating the at least one wind turbine and the transformer from the electrical grid; and
a monitoring unit configured to activate operation of the crowbar circuit in response to determining that there is an overvoltage event occurring at the at least one wind turbine that has the potential to damage the electrical components associated with the wind turbine and transformer.

13. The wind power unit according to claim 12, wherein the monitoring unit comprises a plurality of sensors located about the tower of the at least one wind turbine and the transformer, and a computing unit configured to receive measurements from each of the respective plurality of sensors and use the measurements to detect whether there is an overvoltage event occurring at the wind turbine that has the potential to damage the electrical components associated with the at least one wind turbine and transformer.

14. The wind power unit according to claim 13, wherein the plurality of sensors comprises at least one voltage sensor located about the base of the at least one wind turbine and at least one current sensor located about the transformer at a location that is proximate to the at least one wind turbine.

15. The wind power unit according to claim 12, wherein the computing unit activates operation of the crowbar circuit in response to determining that there is a destructive heating component associated with the overvoltage event.

16. A method for preventing an overvoltage event from damaging a power generation unit having at least one energy converter, a transformer that transfers electrical energy generated from the at least one energy converter to an electrical grid, and at least one fuse located between the electrical grid and the transformer, the method comprising:
coupling a crowbar to the at least one energy converter and the transformer, wherein the crowbar is located between the at least one energy converter and the transformer at a line side of the at least one energy converter, the crowbar configured to prevent an overvoltage event from damaging electrical components associated with the at least one energy converter and the transformer, the overvoltage event being insufficient to activate the at least one fuse;
monitoring the operation of the at least one energy converter and the transformer for a destructive current associated with the overvoltage event that is below a fuse interrupting current; and
activating the crowbar in response to detecting that there is a destructive current associated with the overvoltage event, the activated crowbar diverting the destructive current away from the electrical components and raising the diverted destructive current to a level that causes blowing of the at least one fuse, thereby isolating the energy converter and the transformer from the electrical grid.

* * * * *